Jan. 18, 1938.  E. L. C. WHITE ET AL  2,105,569
DIRECTIONAL WIRELESS AERIAL SYSTEM
Filed April 6, 1936

INVENTORS
E. L. C. WHITE
W. S. PERCIVAL
BY
ATTORNEY

Patented Jan. 18, 1938

2,105,569

UNITED STATES PATENT OFFICE 2,105,569

DIRECTIONAL WIRELESS AERIAL SYSTEM

Eric Lawrence Casling White, Hillingdon, and William Spencer Percival, Hanwell, England, assignors to Electric & Musical Industries Limited, Hayes, England Application April 6, 1936, Serial No. 72,920
In Great Britain April 3, 1935

7 Claims. (Cl. 250—33)

The present invention relates to directional wireless aerial systems such as can be used either for transmission or for reception of electro-magnetic waves. When used for transmission, they are required to radiate the maximum portion of the radiated energy in the direction of the receiving station. When used for reception, they are required to receive as great a portion of the radiation from the transmitter as possible, and to exclude unwanted radiations such as interference arriving in other directions. The arrays can be of similar type for both transmitting and receiving. The gain in efficiency compared with a non-directional radiator or receiver, whether it be expressed as the ratio of wanted to unwanted power radiated, or as signal to noise ratio, is the same for a given type of array. The only difference between transmitting and receiving arrays is that in a receiving array, where the signal strength is sufficient to eliminate any trouble due to noise in the receiving amplifiers, the power efficiency of the array is not of importance, provided that the correct directional diagram is obtained in order to reduce interference pick-up as much as possible. In a transmitting array it is important to keep the power efficiency good in order that a large radiation may be obtained. Arrays may be designed either to give a good horizontal distribution (e. g. to transmit maximum power westward towards a westerly receiving station), or they may be designed to give a good vertical distribution (e. g. radiate maximum power horizontally instead of up and down), or to give a combination of both these desirable properties.

For convenience in description reference will be made more particularly in this specification to transmitting systems and it is to be understood that the systems discussed are also applicable to reception.

In order to obtain such directional arrays it is usual to use radiating elements (which may generally be a quarter to a half a wavelength long), spaced at intervals of a quarter to a half a wavelength apart and suitably phased so that radiation adds up for the wanted direction but subtracts for unwanted directions. The elements of the array may be separated vertically, along the direction of transmission, or across the direction of transmission.

The elements of an array are usually arranged vertically, although other arrangements may be used for some purposes, and they may be spaced apart vertically (for example arranged one above the other) or horizontally. In some cases the line of elements is along the direction of transmission and in other cases it is across it. The resulting radiation diagrams obtained from various arrangements have been very fully plotted in publications. It is however usually considered that a separation between elements of about a quarter wavelength is necessary in order to develop directional diagrams, since without this separation it is impossible to obtain addition of the effects of two elements in one direction and subtraction in another. Consequently, these directional arrays occupy considerable space, and cannot satisfactorily be employed on any but very short wavelengths.

It is the principal object of this invention to provide new or improved directive arrays where the separations between successive elements are shorter than a quarter wavelength, thus allowing a great saving in space to be effected.

According to the present invention there is provided an aerial array comprising a centre element and two outer elements arranged side by side and substantially co-planar and parallel with one another, the two outer elements being spaced apart from the centre element by a distance less than one quarter of the wavelength of signals to be transmitted or received and the elements being so connected that the outer elements are phased at least 135° out of phase with respect to the centre element and that the product of the effective length of and the current flowing in each of the outer elements is substantially half the product of the effective length of and the current flowing in the centre element, characterized in that the said elements are connected to two members of a feeder through lengths of conductor or impedance elements or through both lengths of conductor and impedance elements, whereby the phases and magnitudes of currents flowing in the elements are arranged to have values such that the resultant polar diagram of the array is substantially in the form of the product of a cardioid and a figure of eight.

The electrical phasing described above refers not necessarily to the phase of the currents supplied to an element of a transmitting array since the interaction of the elements may modify the phase of the currents within the elements. The phase relationships described refer in a transmitting array to the phase of the actual currents in the transmitting elements. Similarly the phasing in a receiving array (which involves the same electrical connections) refers to the phase relationships introduced between the voltages applied to the receiver input. The connections are more simply considered by treating an array as being a transmitting array and adjusting the phasing connections so as to obtain correct currents in and voltages on the elements: the array so designed may then be used as a receiving array by replacing the generator by a suitable receiver.

The phasing of the connections to elements of the array may be modified so as to allow for capacity and mutual induction effects of adjacent or closely mounted elements of the array being greater than such effects between widely spaced elements of the array.

The impedance of the feeder and transmitting or receiving apparatus is matched to the impedance of the array, due allowance being made for the change in radiation resistance of any element produced by the adjacent action of elements which are electrically phased almost in opposition.

The invention will now be described by way of example with reference to the accompanying diagrammatic drawing wherein—

Figures 1, 2, 3:
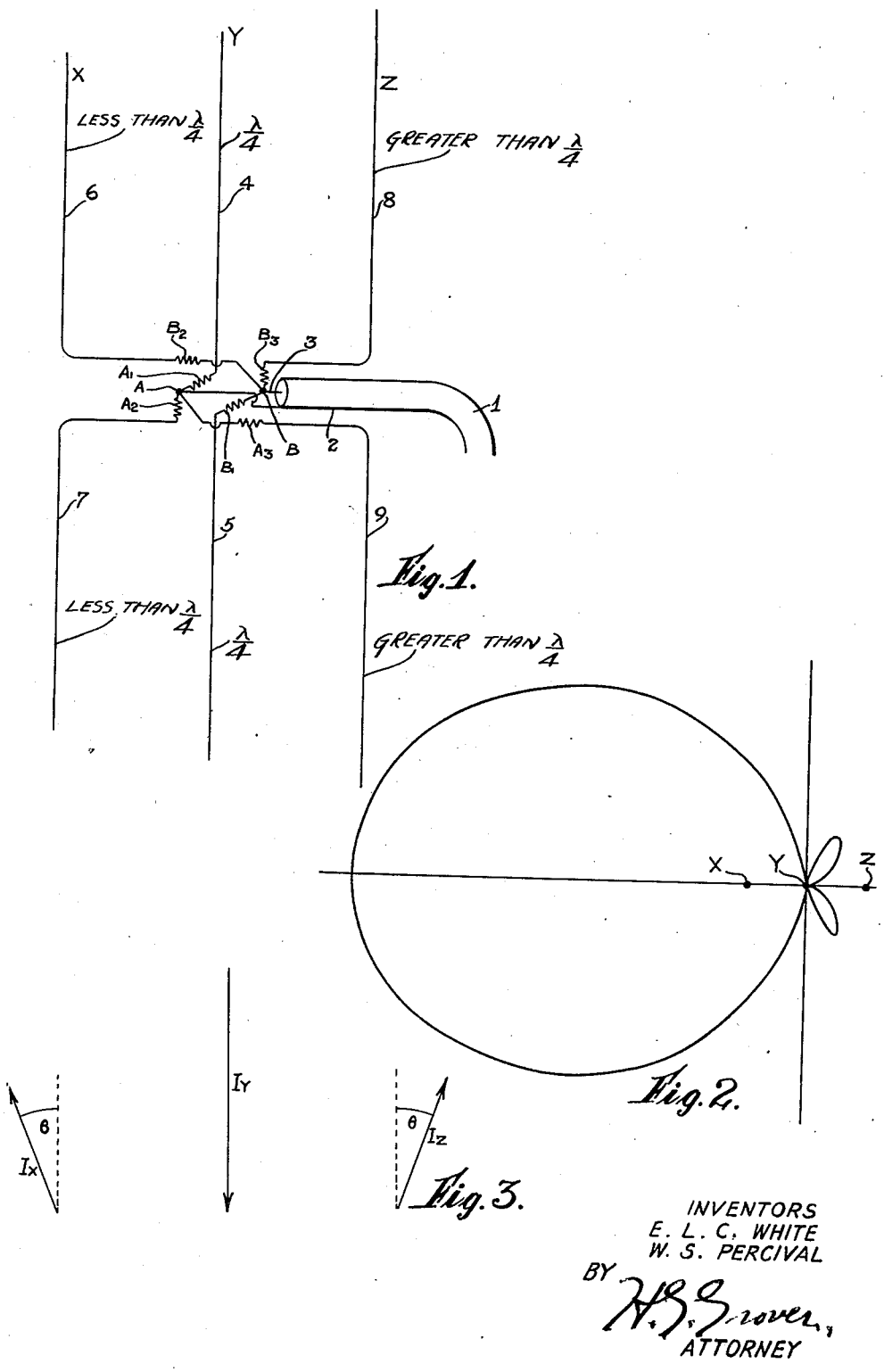
Fig. 1 shows an array according to the invention.
Fig. 2 shows a typical polar diagram of an array according to the invention.
Fig. 3 is a vector diagram of the currents in the elements of Fig. 1.

Referring to Fig. 1 of the drawing, a two wire feeder 1, which is shown as being of the concentric type, is coupled at one end to a wireless transmitting apparatus (not shown). The other ends of the two conductors 2, 3 are indicated by the references A and B and to each of these ends three resistance elements are connected. Those connected to end A are denoted by references $A_1$, $A_2$ and $A_3$ and those connected to end B are denoted by $B_1$, $B_2$ and $B_3$. The central element Y of an aerial array comprises a pair of conductors 4, 5 in the form of straight tubes or rods, each having a length equal or nearly equal to a quarter of the wavelength of signals to be transmitted. These two conductors are arranged in a vertical line, the lower end of the upper conductor 4 and the upper end of the lower conductor 5 being adjacent the end of the feeder remote from the transmitter, and being connected to the free ends of resistance elements $A_1$ and $B_1$ respectively. A second pair of conductors 6, 7 constituting the second element X of the array and also of length equal or nearly equal to one quarter of the wavelength, are connected at one end to the free ends of resistance elements $B_2$ and $A_2$ respectively. These conductors are arranged to extend horizontally for a distance equal to about $1/11$ of the wavelength and they are then each bent through a rightangle, in a vertical plane through the central aerial element, so that the conductor 6 extends vertically upwards from the point of bending and conductor 7 extends vertically downwards as shown. A third pair of conductors 8, 9 similar to the second pair 6, 7 is arranged to form a third element Z, co-planar with elements X and Y, in such a way as to form a structure which is symmetrical about element Y. The upper conductor 8 of element Z is connected to the free end of resistance element $B_3$ and the remaining conductor 9 is connected to the free end of the resistance element $A_3$.

The complete array therefore comprises six conductors forming three aerial elements X, Y and Z, each conductor being connected, through a resistance element, to one conductor of the feeder 1. The currents in the elements X and Z differ in phase from the current in element Y by 180° (caused by the reversal of connections to the feeder wires) less the comparatively small phase change introduced by the resistances and the residual reactances of the elements.

A spacing of about $1/11$ of the wavelength between adjacent elements is preferable since, with this spacing, it has been found that the resistance elements require all to be of substantially the same value. The frequency selectivity is then the same for all the elements and the currents in the elements remain in the same ratio to one another at the side band frequencies and at the carrier frequency. The polar diagram is therefore substantially independent of frequency over a substantial range of side band frequencies.

When the aerial elements are accurately tuned, they operate as series resonance circuits, and their reactance is therefore zero. A change in the coupling resistances has then no effect on the phase of the currents in the elements but merely serves to adjust the current amplitudes.

The polar diagram which is required is that obtained by multiplying each radius vector of a cardioid by the radius vector in the same direction of a figure of eight. An example of such a polar diagram is shown in Fig. 2, in which the elements X, Y, Z of Fig. 1 are shown in plan view.

Fig. 3 shows a vector diagram of the currents in the elements of Fig. 1. The products of the effective currents in and the lengths of the elements X, Y and Z are denoted by $I_X$, $I_Y$ and $I_Z$ respectively. If $\theta$ is the angle (in radians) such that the phases of $I_X$ and $I_Z$ are $\pi-\theta$ and $\pi+\theta$ with respect to the current in element Y respectively, and if $I_X = I_Z$, then for zero radiation in a direction perpendicular to the plane of the array $$2I_X \cos \theta = I_Y \quad (1)$$

For zero radiation in the direction X—Z $$I_X - I_Y \cos(\phi-\theta) + I_Z \cos(2\phi-2\theta) = 0 \quad (2)$$

where $\phi$ represents the phase angle introduced by the separation of adjacent elements. Thus if $d$ is the distance between adjacent elements $$\phi = \frac{2\pi}{\lambda} d$$

When $I_X = I_Z$, this equation reduces to $$2I_X \cos(\phi-\theta) = I_Y \quad (3)$$

From Equations (1) and (3) it will be seen that $\cos \theta = \cos(\phi-\theta)$ from which $$\theta = \frac{\phi}{2} = \frac{\pi d}{\lambda}$$

Thus if $$d = \frac{\lambda}{11}$$

then $$\theta = \frac{\pi}{11} = \text{about } 16°$$

The current in one outer element must therefore be advanced in phase by $$\frac{\pi}{11}$$

and the current in the other outer element must be delayed by $$\frac{\pi}{11}$$

with respect to the phases of the currents which would flow if the connections and lengths were exactly as described above. This advancement and delay of the phases of the currents in the outer elements may be obtained by adjusting the lengths of the conductors of outer elements X and Z, conductors 6 and 7 being arranged to have a length slightly less than one quarter of a wavelength thereby relatively advancing the phase of the currents in these elements and conductors 8 and 9 being arranged to have a length slightly greater than one quarter of a wavelength thereby relatively retarding the phase of the currents therein. The outer aerial elements X and Z are then no longer tuned series resonance circuits and an increase in the values of the resistance elements $A_2$, $B_2$, $A_3$, $B_3$ decreases the phase difference of the outer elements X and Z with respect to the centre element Y.

A small change of phase or amplitude of the currents in the elements changes the normal polar diagram (the diagram obtained by multiplying the magnitude of the radius vector of a figure of eight by the magnitude of the radius vector, in the same direction, of a cardioid) so that the resultant may be in the form of the diagram obtained by multiplying together the magnitudes of corresponding radius vectors of two limacons.

The radiation for a given current in an aerial element will be less with the type of array here discussed than would be obtained with the more normal widely spaced elements. On the other hand, the effect of the proximity and substantially opposite phasing of the element is to reduce the radiation resistance of the individual elements so that, if the ohmic resistance and dielectric losses are small, the same power in the array will generate much larger currents and so compensate for the reduced radiation obtained per ampere. The effect of the proximity of the aerial elements in the array here considered, is to modify the radiation resistance of the elements so that the matching conditions for the feeder are quite different for this type of array from what they are with the usual widely spaced arrays. In order to utilize the good power efficiency possible from closely spaced arrays, it is necessary to match the feeder with due allowance to a modified radiation resistance and to ensure that the ohmic and dielectric losses are not unnecessarily large. A transformer for matching the feeder to the array may be of the quarter wave type comprising a quarter wave section of feeder adjacent the aerial of suitable characteristic impedance or of any other known or suitable type.

We claim:

1. An aerial array comprising a centre aerial element and two outer aerial elements arranged side by side and substantially co-planar and parallel with one another, the two outer aerial elements being spaced apart from the centre aerial element by a distance less than one quarter of the wavelength of signals to be transmitted or received, a feeder comprising two conductor members, and connections including impedance elements between said aerial elements and said members for arranging that the product of the effective length of and the current flowing in each of the outer aerial elements is substantially half the product of the effective length of and the current flowing in the centre aerial element and that the outer aerial elements are so phased at least 135° out of phase with respect to the centre aerial element that the resultant polar diagram of said array is substantially in the form of the product of a cardioid and a figure of eight.

2. An aerial array comprising a centre aerial element and two outer aerial elements arranged side by side and substantially co-planar and parallel with one another, the two outer aerial elements being spaced apart from the centre aerial element by a distance less than one quarter of the wavelength of signals to be transmitted or received, a feeder comprising two conductor members, and connections including impedance elements, comprising lengths of transmission line between said aerial elements and said members for arranging that the product of the effective length of and the current flowing in each of the outer aerial elements is substantially half the product of the effective length of and the current flowing in the centre aerial element and that the outer aerial elements are so phased at least 135° out of phase with respect to the centre aerial element that the resultant polar diagram of said array is substantially in the form of the product of a cardioid and a figure of eight.

3. An aerial array comprising a centre aerial element and two outer aerial elements arranged side by side and substantially co-planar and parallel with one another, the two outer aerial elements being spaced apart from the centre aerial element by a distance less than one quarter of the wavelength of signals to be transmitted or received, a feeder comprising two conductor members, and connections including impedance elements comprising resistances between said aerial elements and said members for arranging that the product of the effective length of and the current flowing in each of the outer aerial elements is substantially half the product of the effective length of and the current flowing in the centre aerial element and that the outer aerial elements are so phased at least 135° out of phase with respect to the centre aerial element that the resultant polar diagram of said array is substantially in the form of the product of a cardioid and a figure of eight.

4. An aerial array comprising a centre aerial element and two outer aerial elements arranged side by side and substantially co-planar and parallel with one another, said aerial elements each comprising two conductors each of length substantially equal to one quarter of the wavelength of signals to be transmitted or received, the two outer aerial elements being spaced apart from the centre aerial element by a distance less than one quarter of said wavelength, a feeder comprising two conductor members, and connections including impedance elements between said aerial elements and said members for arranging that the product of the effective length of and the current flowing in each of the outer aerial elements is substantially half the product of the effective length of and the current flowing in the centre aerial element and that the outer aerial elements are so phased at least 135° out of phase with respect to the centre aerial element that the resultant polar diagram of said array is substantially in the form of the product of a cardioid and a figure of eight.

5. An aerial array comprising a centre aerial element and two outer aerial elements arranged side by side and substantially co-planar and parallel with one another, the two outer aerial elements being spaced apart from the centre aerial element by a distance substantially equal to one eleventh of the wavelength of signals to be transmitted or received, a feeder comprising two conductor members, and connections including impedance elements between said aerial elements and said members for arranging that the product of the effective length of and the current flowing in each of the outer aerial elements is substantially half the product of the effective length of and the current flowing in the centre aerial element and that the outer aerial elements are so phased at least 135° out of phase with respect to the centre aerial element that the resultant polar diagram of said array is substantially in the form of the product of a cardioid and a figure of eight.

6. An aerial array comprising a centre aerial element and two outer aerial elements arranged side by side and substantially co-planar and parallel with one another, said aerial elements each comprising two conductors, said conductors of said centre aerial element each being substantially equal to one-quarter of the wavelength of signals to be transmitted or received, the conductors of one outer aerial element each being arranged to have an effective length slightly less than a quarter of said wavelength, while the conductors of the other outer aerial element are each arranged to have an effective length slightly greater than one-quarter of said wavelength, said two outer aerial elements being spaced apart from the centre aerial element by a distance less than one-quarter of said wavelength, high frequency translating apparatus, and connections from said apparatus to said aerial elements so arranged and designed that the currents in one outer aerial element lead in phase and the currents in the other outer aerial element lag in phase the currents in the centre aerial element.

7. An aerial array comprising a centre aerial element and two outer aerial elements arranged side by side and substantially co-planar and parallel with one another, the two outer aerial elements being spaced apart from the centre aerial element by a distance approximately one-eleventh of the wavelength of signals to be transmitted or received, a feeder system for said aerial elements, and means for causing the currents in the outer aerial elements to differ in phase by substantially the same amount with respect to the phase of the currents in the centre aerial element, the currents in said outer aerial elements differing in phase from the current in said centre aerial element by greater than 90° but less than 180°.

ERIC LAWRENCE CASLING WHITE.
WILLIAM SPENCER PERCIVAL.